United States Patent
Mittal et al.

(10) Patent No.: US 8,930,917 B2
(45) Date of Patent: Jan. 6, 2015

(54) METHOD AND APPARATUS FOR MOBILE APPLICATION DEVELOPMENT AND TESTING THAT AVOIDS REPACKAGING AND REINSTALLATION

(75) Inventors: Romil Mittal, Noida (IN); Rajorshi Ghosh Choudhury, New Delhi (IN)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/477,495

(22) Filed: May 22, 2012

(65) Prior Publication Data

US 2013/0318498 A1    Nov. 28, 2013

(51) Int. Cl.
G06F 9/44    (2006.01)

(52) U.S. Cl.
USPC ............................ 717/134; 717/124; 717/126

(58) Field of Classification Search
None
See application file for complete search history.

(56) References Cited

U.S. PATENT DOCUMENTS

| | | | |
|---|---|---|---|
| 6,802,058 B2 * | 10/2004 | Banavar et al. | 717/134 |
| 7,155,381 B2 * | 12/2006 | Ryzl | 717/134 |
| 7,319,948 B2 * | 1/2008 | Levin et al. | 717/134 |
| 7,346,896 B2 * | 3/2008 | Kounik et al. | 717/134 |
| 8,019,588 B1 * | 9/2011 | Wohlberg et al. | 717/134 |
| 8,176,321 B1 * | 5/2012 | Perry et al. | 717/177 |
| 8,261,231 B1 * | 9/2012 | Hirsch et al. | 717/121 |
| 8,352,903 B1 * | 1/2013 | Friedman | 717/100 |
| 8,443,188 B2 * | 5/2013 | Borde et al. | 717/126 |
| 8,479,154 B1 * | 7/2013 | Friedman | 717/134 |
| 8,799,862 B2 * | 8/2014 | Adamson | 717/124 |
| 8,819,638 B2 * | 8/2014 | Sharma et al. | 717/124 |
| 2003/0208748 A1 * | 11/2003 | Levin et al. | 717/134 |
| 2006/0128369 A1 * | 6/2006 | El Husseini et al. | 455/418 |
| 2007/0006159 A1 * | 1/2007 | Hecht et al. | 717/124 |
| 2008/0288237 A1 * | 11/2008 | Hassan et al. | 703/23 |
| 2009/0259993 A1 * | 10/2009 | Konduri et al. | 717/127 |
| 2009/0307477 A1 * | 12/2009 | Matthew et al. | 717/174 |
| 2010/0192220 A1 * | 7/2010 | Heizmann et al. | 717/124 |
| 2010/0281458 A1 * | 11/2010 | Paladino et al. | 717/106 |
| 2011/0138473 A1 * | 6/2011 | Yee et al. | 726/26 |
| 2012/0278892 A1 * | 11/2012 | Turbin | 717/171 |
| 2012/0317555 A1 * | 12/2012 | Aluru et al. | 717/134 |
| 2012/0331441 A1 * | 12/2012 | Adamson | 717/126 |
| 2013/0036448 A1 * | 2/2013 | Aciicmez et al. | 726/1 |
| 2013/0074046 A1 * | 3/2013 | Sharma et al. | 717/126 |
| 2013/0174128 A1 * | 7/2013 | Kansal et al. | 717/124 |
| 2013/0263098 A1 * | 10/2013 | Duda et al. | 717/134 |
| 2013/0305218 A1 * | 11/2013 | Hirsch et al. | 717/106 |

OTHER PUBLICATIONS

PayPal, "PayPal Sandbox User Guide", Nov. 2004, PayPal Inc., pp. 1-28; <www.auctioninc.com/pdf/sandbox_user_guide.pdf>.*

David Malan, "CS50 Sandbox", 2013 ACM, SIGCSE'13, Mar. 6-9, 2013 Denver, Colorado, USA, pp. 141-146; <http://dl.acm.org/results.cfm?h=l&cfid=426126065&cftoken=89011491>.*

(Continued)

*Primary Examiner* — Thuy Dao
*Assistant Examiner* — Ben C Wang
(74) *Attorney, Agent, or Firm* — Moser Taboada

(57) ABSTRACT

A computer implemented method and apparatus for mobile application development comprises receiving at least one compiled source code file into the temporary sandbox; and testing the at least one compiled source code file in the temporary sandbox.

20 Claims, 4 Drawing Sheets

(56) References Cited

OTHER PUBLICATIONS

Tönjes et al, "A Test-driven Approach for Life Cycle Management of Internet of Things enabled Services", 2012 IEEE, Jul. 4-6, 2012, pp. 1-8; <http://ieeexplore.ieee.org/stamp/stamp.jsp?tp=&arnumber=6294224>.*

"XCODE for iOS" printed from web site https://developer.apple.com/devcenter/ios/index.action on Sep. 12, 2012, 2 pages.

"Eclipse-based Android development" printed from web site Http://developer.android.com/tools/sdk/eclipse-adt.html on Sep. 12, 2012, 1 page.

* cited by examiner

METHOD AND APPARATUS FOR MOBILE APPLICATION DEVELOPMENT AND TESTING THAT AVOIDS REPACKAGING AND REINSTALLATION

BACKGROUND OF THE INVENTION

1. Field of the Invention

Embodiments of the present invention generally relate to mobile software application development and testing and, more particularly, to a method and apparatus for mobile application development and testing that avoids repackaging and reinstallation.

2. Description of the Related Art

Mobile application development is performed in an integrated development environment (IDE) where application developers can write and compile mobile software applications. Ideally, mobile applications should be tested on the mobile devices on which they will ultimately run. This testing environment in the mobile device is called a sandbox. However, mobile platforms such as iPhone or Android do not allow third party IDEs to deploy applications to their private sandbox. In order to test and debug applications on mobile OSes like Android and iOS, the third party application developers must repackage the updated software and reinstall it on the mobile device using iTunes or Xcode. Therefore, while developing applications, it is not possible to see the effect of incremental debugging changes unless the developer repackages the entire application including the incremental change(s) into the desired deployment format and then re-installs the repackaged application on the mobile device. For a developer to test a single one-line change to source code, this imposes a significant overhead on the author in terms of packaging time. It also hinders the authoring experience by preventing IDEs from offering the author seamless transitions between authoring and debugging tasks.

Therefore, there is a need for a method for mobile application development and testing that avoids repackaging and reinstallation.

SUMMARY OF THE INVENTION

Embodiments of the present invention generally relate to a method and apparatus for mobile application development and testing by creating a temporary sandbox on a mobile device. At least one compiled source code file is received into the temporary sandbox. Then, the at least one compiled source code may be tested in the temporary sandbox.

Figure 1:
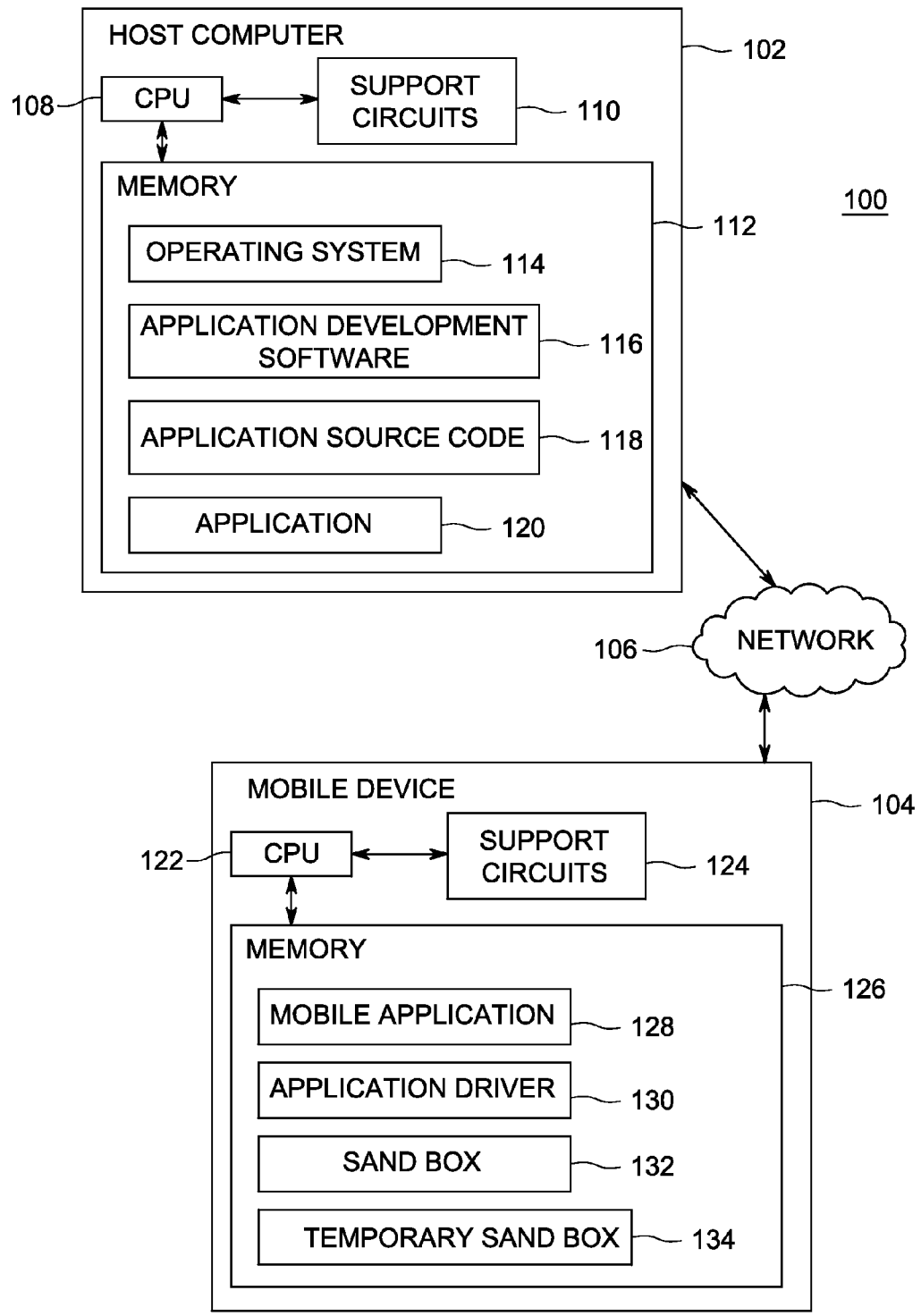
FIG. 1 is a block diagram of a computing system facilitating implementation of a method for mobile application development and testing that avoids repackaging and reinstallation, according to one or more embodiments of the invention.

While the method and apparatus of the invention is described herein by way of example for several embodiments and illustrative drawings, those skilled in the art will recognize that the method for mobile application development that avoids repackaging and reinstallation is not limited to the embodiments or drawings described. It should be understood, that the drawings and detailed description thereto are not intended to limit embodiments of the invention to the particular form disclosed. Rather, the intention is to cover all modifications, equivalents and alternatives falling within the spirit and scope of the method for mobile application development that avoids repackaging and reinstallation, as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of the present invention comprise a method and apparatus for mobile application development and testing that avoids repackaging and reinstallation. Every mobile device comprises a writable area where mobile applications may create and store temporary files. The present invention creates a temporary sandbox in the writable area of the mobile device. Once a mobile application is initially installed on the mobile device, the application driver of the mobile device may receive compiled files representing one or more incremental changes to the mobile application. The application driver writes the compiled files to the temporary sandbox where they may be tested. Changes may be made to the mobile application source code to address issues found during testing. Any changes made by the developers are compiled and the files are again pushed to the temporary sandbox where they can be tested on the mobile device. If more changes are required, the changes are made on the host computer, compiled and pushed to the mobile device where the application driver receives them into the temporary sandbox. This continues until all testing and debugging is complete. When all testing and debugging is complete, the temporary sandbox is discarded (that is, removed from the writeable area of the mobile device). Advantageously, the developer can test and debug software changes in the environment in which the software application will ultimately run without requiring repackaging and reinstallation. Only after all new development and testing/debugging tasks are complete, must the developer repackage and reinstall the upgraded mobile application using normal procedures, such as through iTunes, XCode and the like.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 depicts a block diagram of a computing system 100 facilitating implementation of a method for mobile application development that avoids repackaging and reinstallation, according to one or more embodiments. The system 100 comprises a host computer 102, a mobile device 104 and a network 106. The host computer 102 and the mobile device 104 are communicatively coupled via the network 106.

The host computer 102 is a type of computing device (e.g., a laptop, a desktop, a Personal Digital Assistant (PDA), a tablet and/or the like). The host computer 102 comprises a Central Processing Unit (or CPU) 108, a memory 112 and support circuits 110. The CPU 108 may comprise one or more commercially available microprocessors or microcontrollers that facilitate data processing and storage. The various support circuits 110 facilitate the operation of the CPU 108 and include one or more clock circuits, power supplies, cache, input/output circuits, and the like. The memory 112 comprises at least one of Read Only Memory (ROM), Random Access Memory (RAM), disk drive storage, optical storage, removable storage and/or the like. The memory 112 comprises an Operating System (OS) 114, application development software 116, application source code 118, and an application 120. The operating system 114 may comprise various commercially known operating systems.

The mobile device 104 is a type of computing device (e.g., a laptop, a desktop, a Personal Digital Assistant (PDA), a tablet, a mobile phone and/or the like). The mobile device 104 comprises a Central Processing Unit (CPU) 122, support circuits 124, and a memory 126. The CPU 122 may comprise one or more commercially available microprocessors or microcontrollers that facilitate data processing and storage. The various support circuits 124 facilitate the operation of the CPU 122 and include one or more clock circuits, power supplies, cache, input/output circuits, transceiver, displays, accelerometers, gyroscopes and the like. The memory 126 comprises at least one of Read Only Memory (ROM), Random Access Memory (RAM), disk drive storage, optical storage, removable storage and/or the like. The memory 126 comprises a mobile application 128, an application driver 130, a sandbox 132, and a temporary sandbox 134.

The application development software 116 can be any application software such as ADOBE® FLASH® Builder® or ADOBE® FLASH® Professional (as provided by Adobe Systems, Inc. of San Jose, Calif.). These applications use the ADOBE® AIR® software development kit to package ADOBE® AIR® applications; however the application development software 116 can be any application software capable of developing mobile applications.

The application development software 116 is used to develop the application source code 118. After initial deployment of a mobile application, incremental changes are made to the application source code 118. These changes are compiled to create an application 120. The application driver 130 on the mobile device 104 is set to listening mode when the mobile application 128 is installed on the mobile device 104. When changes are made to the application source code 118 on the host computer 102, the application driver 130 sends a request for the application 120. Because third party IDEs may not deploy the application 120 to the mobile device 104, the application driver 130 emulates the mobile device sandbox 132 to create a temporary sandbox 134 in the writable area of the mobile device 104. Developers test and debug the application 120 in the temporary sandbox 134. If changes are needed, developers make the changes to the application source code 118 on the host computer 102, recompile the application 120, push it to the mobile device 104, where the application driver 130 writes it to the temporary sandbox 134. This process iterates until the debugging is completed. When all debugging is complete, the application driver 130 deletes the temporary sandbox 134. The application driver 130 remains in listening mode to await futures changes to the application source code 118 on the host computer 102.

Figure 2:
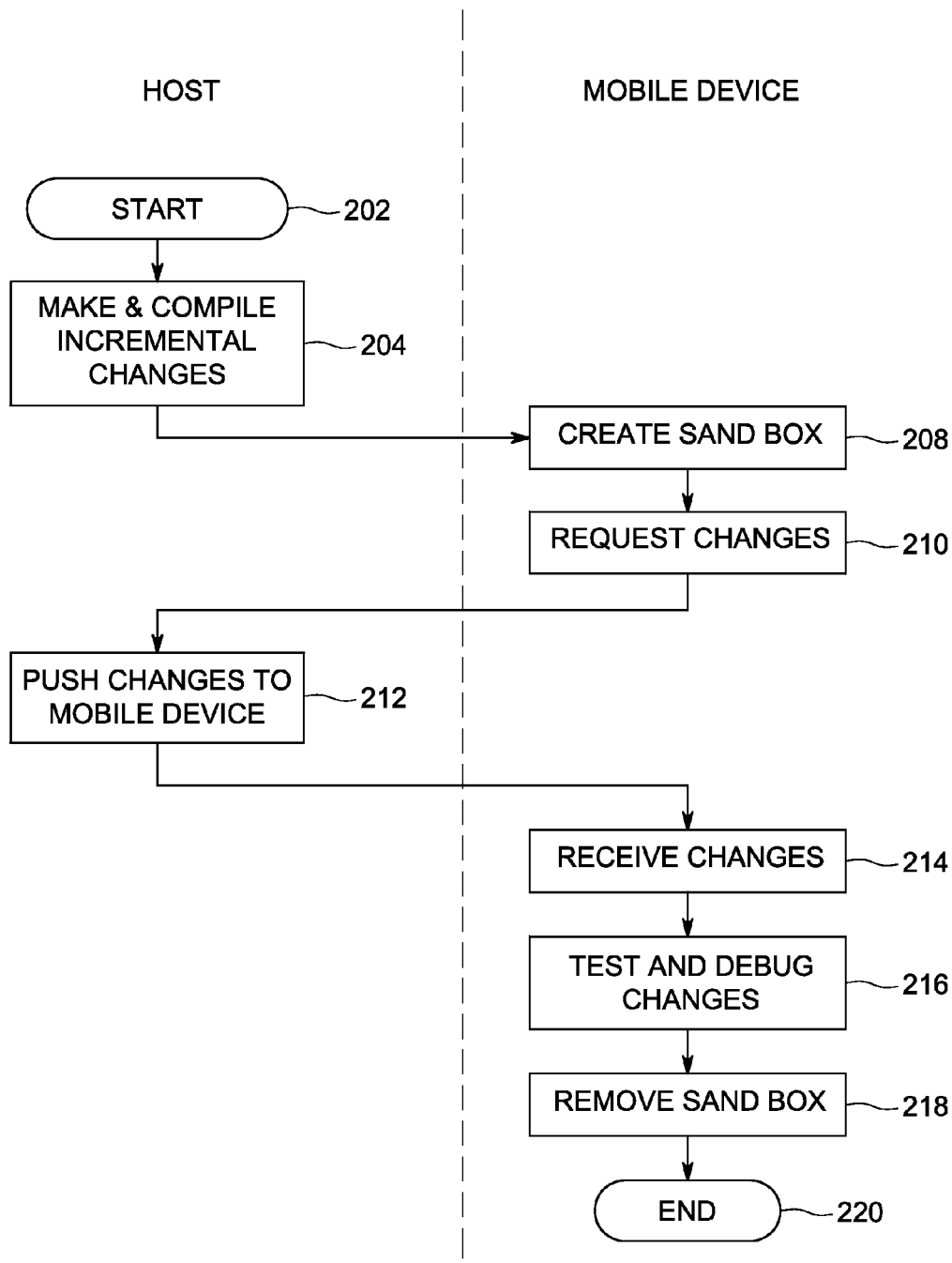
FIG. 2 depicts a flow diagram of a method for performing testing and debugging tasks between the host computer and the mobile device of FIG. 1, according to one or more embodiments of the invention.

FIG. 2 is a flow diagram of a method 200 for performing testing and debugging tasks between the host computer 102 and the mobile device 104 of FIG. 1, according to one or more embodiments of the invention.

The method 200, according to one embodiment of the invention, creates a temporary sandbox in the writable area of a mobile device memory to receive compiled changes to the application source code. The changes are tested and debugged in the temporary sandbox. If any further changes are required during the debugging process they are made on the host computer and pushed onto the mobile device where they are written in the temporary sandbox. When debugging tasks are complete, the temporary sandbox is discarded (that is, removed from the writeable area of the mobile device).

The method 200 starts at step 202, and proceeds to step 204. At step 204, changes are made to the application software. In one embodiment, the entire software application is pushed to the temporary sandbox for testing and debugging. In another embodiment, only incremental changes are pushed to the temporary sandbox for testing and debugging. These changes may be a simple change to one line of source code, or as extensive as the addition of a feature to the mobile application. These changes need to be tested and debugged before being deployed in a later version of the mobile application. The method 200 proceeds to step 206.

At step 206, the method 200 compiles the source code with the changes. Compiling comprises converting the actionscript source code into bytecode (e.g., a swf file) which Adobe® Flash® Runtime™, as well as other software applications, can understand. A SWF file format is defined by the SWF File Format specification (version 10) as published, at http://www.adobe.com/devnet/swf.html, by Adobe Systems Incorporated of San Jose, Calif. The method 200 proceeds to step 208.

At step 208, the method 200 creates a temporary sandbox in memory on the mobile device. The application driver on the mobile device is in listening mode. The application driver looks for content from the host computer. This content is not always an entire mobile application. Only the modified files that require testing and debugging are included in the content. When the host computer has newly compiled, but untested files, the application driver will create a temporary sandbox in which to load the untested files and send a request to the host for the files. Mobile devices have their own private sandbox, but the mobile operating systems do not allow third parties to download content into their private sandbox. The private sandbox is a static allocated memory space. However, mobile devices comprise a writable area in memory, in which all installed mobile applications may write temporary files which may be needed when a mobile application is running. The method 200 emulates the mobile device's private sandbox and creates a copy of it in the writable area of the mobile device memory. As described below, the copy is a temporary folder on the mobile device which will be used for testing and debugging the application changes. The method 200 proceeds to step 210.

At step 210, the method 200 sends a request to the host computer to receive the compiled untested files. The method proceeds to step 212. At step 212, the method 200 pushes a compiled untested file, such as an .swf file (or files) which were modified, from the host to the mobile device. The method 200 proceeds to step 214. At step 214, the method 200 receives the .swf files and writes them to the temporary sandbox. The changes can then be tested and debugged in the temporary sandbox in accordance with its modification by the received .swf file (or files). The method 200 proceeds to step 216.

At step 216, the method 200 tests and debugs the application. Debugging is performed on the files in the sandbox to ensure the application is running as expected, as explained in more detail in FIG. 3 below. As described in FIG. 3, if during testing, the application requires modification; the modifications are made on the host computer, recompiled, and pushed onto the mobile device. This process iterates until all debugging tasks are complete. The method 200 proceeds to step 218. At step 218, the method 200 discards the temporary sandbox from the mobile device. The method 200 proceeds to step 220 and ends.

Figure 3:
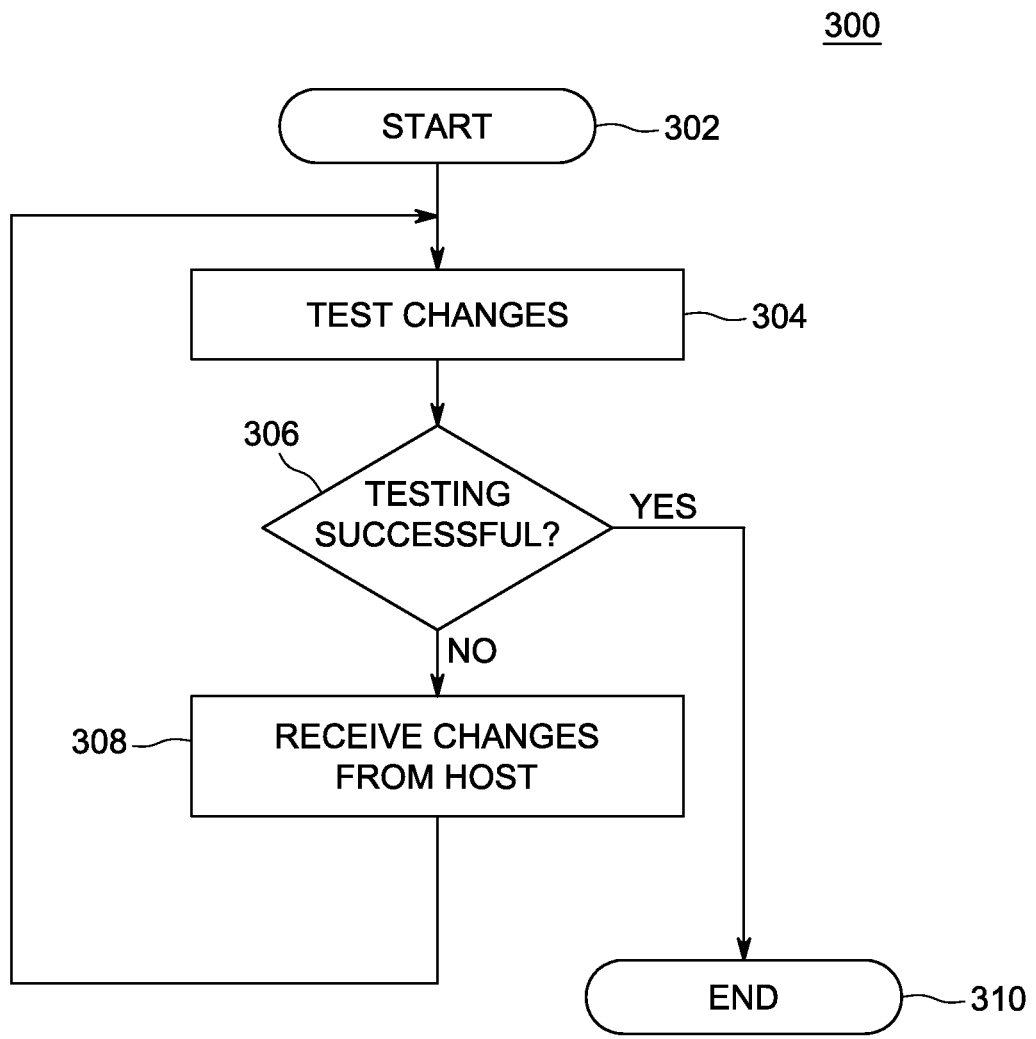
FIG. 3 depicts a flow diagram of a method for using the temporary sandbox to test the mobile application changes from FIG. 2, according to one or more embodiments of the invention.

FIG. 3 is a flow diagram of the method 300 for using the temporary sandbox to test changes made to the mobile application source code from FIG. 2, according to one or more embodiments of the invention.

The method 300, according to one embodiment, tests the changes received from the host computer. The testing is performed in the temporary sandbox, which emulates the mobile device's environment. If testing is unsuccessful, additional changes are made to the source code on the host computer and the additional changes are pushed to the temporary sandbox. Testing and debugging continues until all software testing is successful and debugging is complete.

The method 300 starts at step 302, and proceeds to step 304. At step 304, the method 300 performs tests on the files in the temporary sandbox. The testing is performed to ensure the application performs as expected. The method 300 proceeds to step 306. At step 306, the method 300 determines if testing was successful. If testing is not successful and the application is not performing as expected, then additional changes are required to be made to the source code. The method 300 proceeds to step 308. At step 308, the method 300 receives new changes from the host. The new changes will address the issues from the previously unsuccessful tests. The method 300 proceeds to step 304, where testing resumes. This process iterates until at step 306, all tests are successful. If at step 306, the method 300 determines that all tests are successful and debugging is complete, the method 300 proceeds to step 310 and ends.

The embodiments of the present invention may be embodied as methods, apparatus, electronic devices, and/or computer program products. Accordingly, the embodiments of the present invention may be embodied in hardware and/or in software (including firmware, resident software, micro-code, etc.), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium include the following: hard disks, optical storage devices, a transmission media such as those supporting the Internet or an intranet, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Example Computer System

Figure 4:
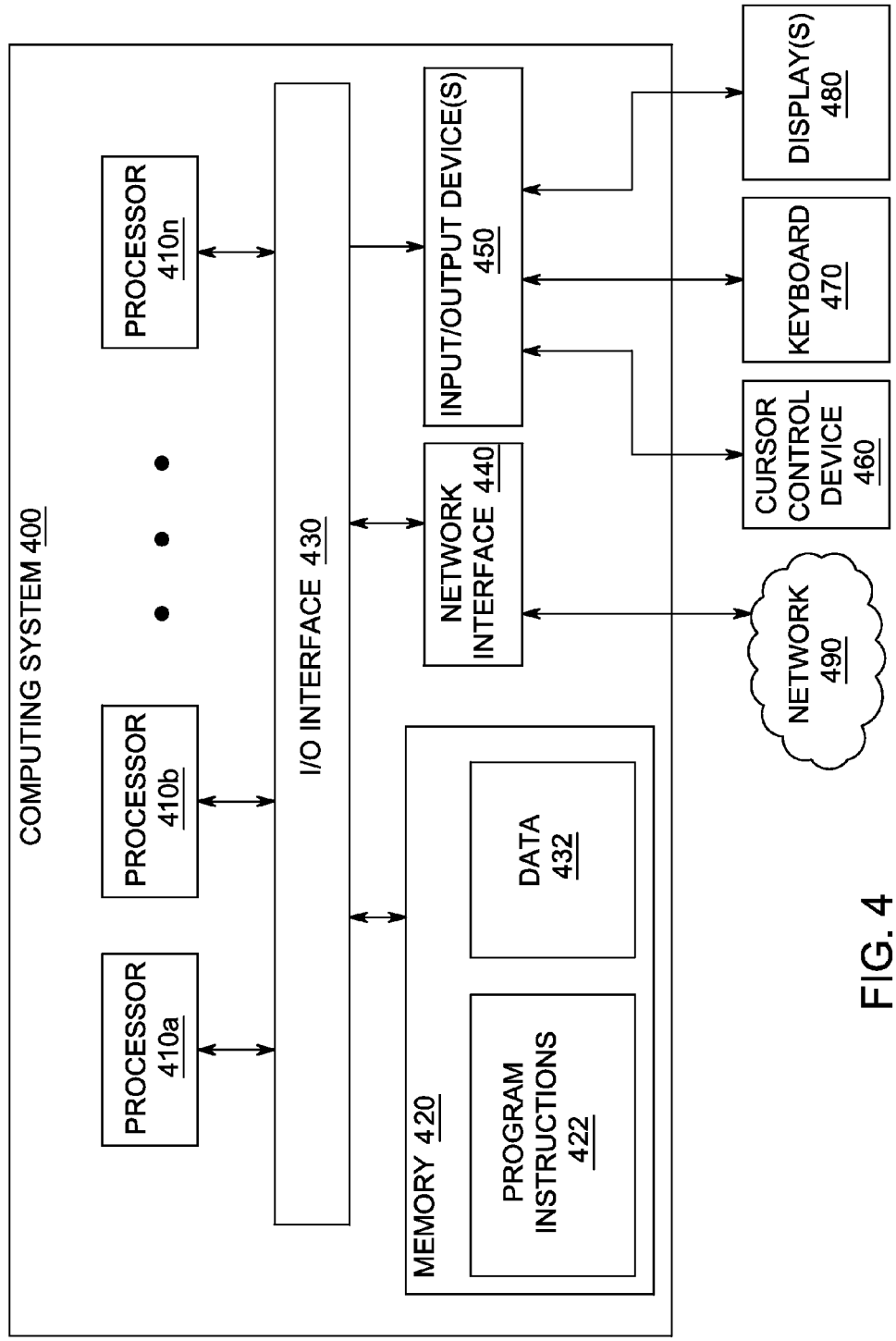
FIG. 4 depicts a computer system that can be utilized in various embodiments of the present invention, according to one or more embodiments.

FIG. 4 depicts a computer system that can be utilized in various embodiments of the present invention, according to one or more embodiments.

Various embodiments of a method for mobile application development and testing that avoids repackaging and reinstallation, as described herein, may be executed on one or more computer systems, which may interact with various other devices. One such computer system is computer system 400 illustrated by FIG. 4, which may in various embodiments implement any of the elements or functionality illustrated in FIGS. 1-3. In various embodiments, computer system 400 may be configured to implement methods described above. The computer system 400 may be used to implement any other system, device, element, functionality or method of the above-described embodiments. In the illustrated embodiments, computer system 400 may be configured to implement methods 200 and 300 as processor-executable executable program instructions 422 (e.g., program instructions executable by processor(s) 410*a-n*) in various embodiments.

In the illustrated embodiment, computer system 400 includes one or more processors 410*a-n* coupled to a system memory 420 via an input/output (I/O) interface 430. The computer system 400 further includes a network interface 440 coupled to I/O interface 430, and one or more input/output devices 450, such as cursor control device 460, keyboard 470, and display(s) 480. In various embodiments, any of components may be utilized by the system to receive user input described above. In various embodiments, a user interface (e.g., user interface) may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device. The computer system 400 may be the host computer 102 of FIG. 1 or the computer system 400 may be the mobile device 104 of FIG. 1.

In various embodiments, computer system 400 may be a uniprocessor system including one processor 410, or a multiprocessor system including several processors 410 (e.g., two, four, eight, or another suitable number). Processors 410*a-n* may be any suitable processor capable of executing instructions. For example, in various embodiments processors 410 may be general-purpose or embedded processors implementing any of a variety of instruction set architectures (ISAs), such as the x96, PowerPC, SPARC, or MIPS ISAs, or any other suitable ISA. In multiprocessor systems, each of processors 410*a-n* may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one components (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowcharts of FIGS. 2 and 3. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, etc. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method comprising:
installing, in a memory of a mobile device, an application and application driver, wherein the application driver is configured when executed by a processor of the mobile device
to determine when one of an untested version of the installed application or an untested incremental change to the installed application is available from a host computer,
to receive at least one compiled source code file determined to be available, the at least one compiled source code corresponding to a modified portion of the untested version or corresponding to at least one incremental change,
to emulate a temporary mobile device sandbox for the requested compiled source code by creating a temporary sandbox in a writable memory area of the mobile device already accessible to the installed application when writing temporary files is required during execution of the installed application, and
to write at least one compiled source code file into the temporary sandbox;
writing the at least one compiled source code file to the temporary mobile device sandbox;
testing the at least one compiled source code file in the temporary sandbox; and
discarding the temporary sandbox after testing is complete.

2. The method of claim 1, further comprising
determining availability of a change to the installed application,
wherein the writing comprises receiving and writing only one or more modified files, of the installed application, to be tested as at least one compiled source code file; and
wherein the received at least one compiled source code file is neither an update to nor an additional function of the installed application.

3. The method of claim 1, further comprising determining, after the testing, whether the received at least one compiled source code file included an error and, if not, deleting the at least one compiled source code file from the temporary sandbox and performing the discarding by removing the temporary sandbox from the writeable area in the memory of the mobile device, thereby conserving usable memory.

4. The method of claim 3, further comprising, if the at least one compiled source code included an error, deleting the at least one compiled source code file from the temporary sandbox and replacing the at least one compiled source code file after debugging.

5. The method of claim 4, further comprising requesting a second compiled source code file into the temporary sandbox if an error is found during testing, wherein the second compiled file represents a correction to the at least one compiled source code file containing an error.

6. The method of claim 1, further comprising determining, after the testing, whether the received at least one compiled source code file included an error and, if so, iteratively debugging and replacing each compiled source code file determined to include an error and re-performing the testing until no errors are determined, and
responsive to failure to determine an error after re-performing testing, deleting all files from the temporary sandbox and performing the discarding by removing the temporary sandbox from the writeable area in the memory of the mobile device, thereby conserving usable memory.

7. The method of claim 1, further comprising entering a listening mode of the application driver when the application is installed on the mobile device, and responding to availability of the at least one compiled source code file by requesting download of the at least one compiled source code file prior to the writing.

8. An apparatus for mobile application development and testing comprising:
an application driver stored in a memory area of a mobile device, wherein the application driver is associated with an installed application stored in a memory area of the mobile device and is configured when executed by a processor of the mobile device:
- to determine when one of an untested portion of the installed application or an untested incremental change to the installed application is available from a host computer,
- to request download of at least one compiled source code file corresponding to an untested portion of the application or an incremental change determined to be available,
- to emulate a temporary mobile device sandbox for the requested compiled source code by creating a temporary sandbox in a writable memory area of the mobile device already accessible to an installed application when writing temporary files is required while the installed application is being executed,
- to receive and write the at least one compiled source code file into the temporary sandbox,
- to facilitate testing of the at least one compiled source code file, and
- to discard the temporary sandbox after testing is complete.

9. The apparatus of claim 8, wherein the received at least one compiled source code file is neither an update to nor an additional function of the installed application.

10. The apparatus of claim 8, wherein the application driver is configured to facilitate testing by determining whether the received at least one compiled source code file included an error and, if not, deleting the at least one compiled source code file from the temporary sandbox and performing the discarding by removing the temporary sandbox from the writeable area in the memory of the mobile device, thereby conserving usable memory.

11. The apparatus of claim 8, wherein the application driver is configured to facilitate testing by finding at least one error in the at least one untested compiled source code file on the mobile device.

12. The apparatus of claim 11, wherein the application driver is further configured to facilitate testing by receiving a second compiled file representing a correction to the at least one compiled source code file into the temporary sandbox.

13. The apparatus of claim 8, wherein the application driver is further configured to facilitate testing by entering a listening mode of the application driver when the application is installed on the mobile device, and responding to availability of the at least one compiled source code file by requesting download of the at least one compiled source code file prior to the writing.

14. A non-transitory computer readable medium for storing computer instructions that, when executed by at least one processor cause the at least one processor to perform a method of mobile application development and testing comprising:
- installing, in a memory of a mobile device, an application and application driver, wherein the application driver is configured when executed by a processor of the mobile device
  - to determine when one of an untested version of the installed application or an untested incremental change to the installed application is available from a host computer,
  - to receive at least one compiled source code file determined to be available, the at least one compiled source code corresponding to a modified portion of the untested version or corresponding to at least one incremental change,
  - to emulate a temporary mobile device sandbox for the requested compiled source code by creating a temporary sandbox in a writable memory area of the mobile device already accessible to the installed application when writing temporary files is required during execution of the installed application, and
  - to write the at least one compiled source code file into the temporary sandbox;
- writing the at least one compiled source code file to the temporary mobile device sandbox;
- testing the at least one compiled source code file in the temporary sandbox; and
- discarding the temporary sandbox after testing is complete.

15. The computer readable medium of claim 14, wherein the method further comprises
- determining availability of a change to the installed application,
- wherein the writing comprises receiving and writing only one or more modified files, of the installed application, to be tested as at least one compiled source code file; and
- wherein the received at least one compiled source code file is neither an update to nor an additional function of the installed application.

16. The computer readable medium of claim 15, wherein the method further comprises requesting a second compiled source code file into the temporary sandbox if an error is found during testing, wherein the second compiled file represents a correction to the at least one compiled source code file containing an error.

17. The computer readable medium of claim 14, wherein the method further comprises determining, after the testing, whether the received at least one compiled source code file included an error and, if not, deleting the at least one compiled source code file from the temporary sandbox and performing the discarding by removing the temporary sandbox from the writeable area in the memory of the mobile device, thereby conserving usable memory.

18. The computer readable medium of claim 17 wherein the method further comprises, if the at least one compiled source code included an error, deleting the at least one compiled source code file from the temporary sandbox and replacing the at least one compiled source code file after debugging.

19. The computer readable medium of claim 14, wherein the method further comprises determining, after the testing, whether the received at least one compiled source code file included an error and, if so, iteratively debugging and replacing each compiled source code file determined to include an error and re-performing the testing until no errors are determined, and
- responsive to failure to determine an error after re-performing testing, deleting all files from the temporary sandbox and performing the discarding by removing the temporary sandbox from the writeable area in the memory of the mobile device, thereby conserving usable memory.

20. The computer readable medium of claim 14, wherein testing further includes entering a listening mode of the application driver when the application is installed on the mobile device, and responding to availability of the at least one compiled source code file by requesting download of the at least one compiled source code file prior to the writing.

* * * * *